United States Patent
Matsumoto et al.

(10) Patent No.: US 12,535,329 B2
(45) Date of Patent: Jan. 27, 2026

(54) INFORMATION PROCESSING DEVICE, INFORMATION PROCESSING SYSTEM, INFORMATION PROCESSING METHOD, AND NON-TRANSITORY STORAGE MEDIUM STORING INFORMATION PROCESSING PROGRAM

(71) Applicant: TOYOTA JIDOSHA KABUSHIKI KAISHA, Toyota (JP)

(72) Inventors: Kyosuke Matsumoto, Miyoshi (JP); Osami Hashimoto, Mishima (JP); Hiroki Tashima, Fujisawa (JP); Toshihiko Inoue, Nagoya (JP); Kazuma Toya, Anjyo (JP); Takashi Tazoe, Nagoya (JP); Ryota Bingo, Nisshin (JP); Kosuke Sakakibara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 105 days.

(21) Appl. No.: 18/539,708

(22) Filed: Dec. 14, 2023

(65) Prior Publication Data
US 2024/0210193 A1 Jun. 27, 2024

(30) Foreign Application Priority Data
Dec. 23, 2022 (JP) .................................. 2022-207594

(51) Int. Cl.
*G01C 21/34* (2006.01)
(52) U.S. Cl.
CPC ..... *G01C 21/3492* (2013.01); *G01C 21/3461* (2013.01)

(58) Field of Classification Search
CPC ................ G01C 21/34; G01C 21/3453; G01C 21/3461; G01C 21/3492; G01C 21/3602; G01C 21/3658
See application file for complete search history.

(56) References Cited

U.S. PATENT DOCUMENTS

| 9,865,019 | B2 * | 1/2018 | Bogovich | ........ G08G 1/096816 |
| 10,466,717 | B1 * | 11/2019 | Su | .......... G06N 3/045 |

(Continued)

FOREIGN PATENT DOCUMENTS

| CA | 3033961 A1 * | 2/2018 | ........ B60W 60/0015 |
| CN | 103954294 A * | 7/2014 | ......... G01C 21/3492 |

(Continued)

*Primary Examiner* — Babar Sarwar
(74) *Attorney, Agent, or Firm* — Dinsmore & Shohl LLP

(57) ABSTRACT

An information processing device, comprising a processor that is configured to: receive, as preference information, information related to a specific category comprising at least one of a category of vehicle to avoid encountering or a category of vehicle for which an encounter is desired; acquire a satellite image of travel path surroundings of a host vehicle; detect another vehicle, which corresponds to the specific category, based on the preference information, from among other vehicles captured in the satellite image; and output, to a display region provided inside the vehicle cabin of the host vehicle, route information related to a route comprising at least one of a route having a low probability of encountering another vehicle, which corresponds to the category of vehicle to avoid encountering, or a route having a high probability of encountering another vehicle, which corresponds to the category of vehicle for which an encounter is desired.

6 Claims, 6 Drawing Sheets

(56) References Cited

U.S. PATENT DOCUMENTS

| | | | | |
|---|---|---|---|---|
| 10,513,274 B1* | 12/2019 | Sung | | G05D 1/0088 |
| 11,017,475 B1* | 5/2021 | Dunham | | G06Q 40/08 |
| 11,300,977 B2* | 4/2022 | Ghanbari | | G05D 1/0274 |
| 11,609,579 B2* | 3/2023 | Forney | | G07C 5/0841 |
| 12,198,196 B2* | 1/2025 | Fields | | G01C 21/3461 |
| 2011/0161116 A1* | 6/2011 | Peak | | G16H 10/40 |
| | | | | 345/173 |
| 2014/0236414 A1* | 8/2014 | Droz | | G08G 1/166 |
| | | | | 701/1 |
| 2014/0343849 A1* | 11/2014 | Ohzawa | | G01C 21/3492 |
| | | | | 701/537 |
| 2015/0204687 A1* | 7/2015 | Yoon | | G06T 19/006 |
| | | | | 701/436 |
| 2017/0116862 A1* | 4/2017 | Inoue | | G08G 1/161 |
| 2017/0176192 A1* | 6/2017 | Cardoso de Moura | | |
| | | | | H04W 4/024 |
| 2017/0227966 A1* | 8/2017 | Monzen | | B62D 15/0255 |
| 2017/0292845 A1* | 10/2017 | Yamasaki | | G01C 21/3415 |
| 2017/0309172 A1* | 10/2017 | Linder | | G08G 1/0112 |
| 2018/0224863 A1* | 8/2018 | Fu | | G01C 21/3848 |
| 2018/0286246 A1* | 10/2018 | Baca | | G08G 1/162 |
| 2019/0179304 A1* | 6/2019 | Iagnemma | | G05D 1/0088 |
| 2019/0392235 A1* | 12/2019 | Shimizu | | G06V 20/597 |
| 2020/0019263 A1 | 1/2020 | Korherr et al. | | |
| 2020/0056897 A1* | 2/2020 | Williamson | | G01C 21/3602 |
| 2020/0072637 A1* | 3/2020 | Guidotti | | G01C 21/3461 |
| 2020/0126415 A1* | 4/2020 | Lin | | G08G 1/096741 |
| 2021/0056477 A1* | 2/2021 | Ahire | | G06Q 10/0635 |
| 2021/0089938 A1* | 3/2021 | Ariannezhad | | G08G 1/096775 |
| 2022/0032924 A1* | 2/2022 | Jeihani | | B60W 50/14 |
| 2022/0074758 A1* | 3/2022 | Sameer | | G06N 20/10 |
| 2022/0176986 A1* | 6/2022 | Lei | | B60W 60/001 |
| 2022/0252414 A1* | 8/2022 | Lerner | | G06Q 30/0283 |
| 2022/0281456 A1* | 9/2022 | Giovanardi | | G08G 1/0112 |
| 2023/0065414 A1* | 3/2023 | Ariannezhad | | G01C 21/3461 |
| 2023/0106925 A1* | 4/2023 | Chisu | | G01C 21/3453 |
| | | | | 701/23 |
| 2023/0119620 A1* | 4/2023 | Chow | | G01C 21/3602 |
| | | | | 701/436 |
| 2023/0127182 A1* | 4/2023 | Mayster | | G06V 20/182 |
| | | | | 701/423 |
| 2023/0154323 A1* | 5/2023 | Yamala | | G08G 1/0112 |
| | | | | 701/119 |
| 2023/0286514 A1* | 9/2023 | Ucar | | B60W 60/0017 |
| 2023/0349704 A1* | 11/2023 | Quint | | G08G 1/096716 |
| 2023/0349706 A1* | 11/2023 | Sanchez | | G06N 3/08 |
| 2024/0060784 A1* | 2/2024 | Carlsten | | G01C 21/3602 |
| 2024/0060789 A1* | 2/2024 | Gross | | H04L 67/306 |
| 2024/0096226 A1* | 3/2024 | Horton | | G05B 13/048 |
| 2024/0102817 A1* | 3/2024 | Bales | | G01C 21/3461 |
| 2024/0125939 A1* | 4/2024 | Moraru | | G01C 21/34 |
| 2024/0391464 A1* | 11/2024 | Cardona | | G06T 7/292 |
| 2025/0065894 A1* | 2/2025 | Luo | | B60W 50/0205 |
| 2025/0067570 A1* | 2/2025 | Ivanov | | G06V 20/597 |

FOREIGN PATENT DOCUMENTS

| | | | | |
|---|---|---|---|---|
| CN | 115880892 A * | 3/2023 | | G01C 21/34 |
| JP | 2001-188986 A | 7/2001 | | |
| JP | 2006-189269 A | 7/2006 | | |
| JP | 2020-038625 A | 3/2020 | | |
| JP | 2021-036365 A | 3/2021 | | |
| JP | 2022-086702 A | 6/2022 | | |
| KR | 2486726 B1 * | 1/2023 | | G01C 21/3461 |
| WO | WO-2009105289 A2 * | 8/2009 | | G01C 21/3461 |
| WO | 2020/194391 A1 | 10/2020 | | |

* cited by examiner

INFORMATION PROCESSING DEVICE, INFORMATION PROCESSING SYSTEM, INFORMATION PROCESSING METHOD, AND NON-TRANSITORY STORAGE MEDIUM STORING INFORMATION PROCESSING PROGRAM

CROSS-REFERENCE TO RELATED APPLICATION

This application is based on and claims priority under 35 USC 119 from Japanese Patent Application No. 2022-207594 filed on Dec. 23, 2022, the disclosure of which is incorporated by reference herein.

BACKGROUND

Technical Field

The present disclosure relates to an information processing device, an information processing system, an information processing method, and a non-transitory storage medium storing an information processing program.

Related Art

Japanese Patent Application Laid-open (JP-A) No. 2021-36365 discloses a vehicle guidance system that guides an ordinary vehicle so as to avoid encountering dangerous vehicles that perform dangerous driving, such as meandering, cutting in, suddenly appearing out of nowhere, or excessive speed. This vehicle guidance system has functionality that identifies dangerous vehicles based on vehicle information including travel history such as accident history, and that identifies an ordinary vehicle that is predicted to encounter a dangerous vehicle. Moreover, the vehicle guidance system has a function of setting a travel plan path of an ordinary vehicle to a path that does not encounter a dangerous vehicle.

In addition to dangerous vehicles, there may be other vehicles with which encounters are avoided, depending on the preferences of the user. As an example, although a bus does not correspond to the dangerous vehicles described above, some users may want to avoid traveling behind a bus because of the annoyance of having to stop each time the bus stops. On the other hand, there may be other vehicles that the user wishes to encounter, depending on the preferences of the user, such as rare vehicle types.

In JP-A No. 2021-36365, since a dangerous vehicle is identified using vehicle information acquired from respective vehicles, the vehicle cannot be identified according to a detailed classification. Accordingly, it is not possible to propose a route that enables a specific other vehicle to be avoided or a route that enables a specific other vehicle to be encountered, in accordance with a user's preference.

In consideration of the foregoing circumstances, the present disclosure provides an information processing device, an information processing system, an information processing method, and a non-transitory storage medium storing an information processing program that are able to propose at least one of a route that enables a specific other vehicle to be avoided and/or a route that enables a specific other vehicle to be encountered, in accordance with a user's preference.

An information processing device of a first aspect includes: a preference receiving unit that receives, as preference information, information related to a specific category that is at least one of a category of vehicle to avoid encountering or a category of vehicle for which an encounter is desired, from an input device provided inside a vehicle cabin of a host vehicle; a satellite image acquisition unit that acquires a satellite image of travel path surroundings of the host vehicle; a detection unit that detects another vehicle, which corresponds to the specific category, based on the preference information, from among other vehicles captured in the satellite image; and an information output unit that outputs, to a display region provided inside the vehicle cabin of the host vehicle, route information related to a route comprising at least one of a route having a low probability of encountering another vehicle, which corresponds to the category of vehicle to avoid encountering, or a route having a high probability of encountering another vehicle, which corresponds to the specific category for which there is a desire to encounter.

According to the information processing device of the first aspect, the preference receiving unit receives, as preference information, information related to a specific category that is at least one of a category of other vehicle that a user of the host vehicle wishes to avoid encountering or a category of other vehicle that the user of the host vehicle wishes to encounter, from an input device provided inside a vehicle cabin of the host vehicle. Namely, if a user of the host vehicle wishes to avoid encounters with other vehicles belonging to a specific category, and has input this wish into the input device of the host vehicle, an indication to the effect that avoidance is desired and information related to with what kind of other vehicle encounters are avoided is received as preference information. Moreover, in cases in which a user of the host vehicle wishes to encounter other vehicles belonging to a specific category and has input this wish into the input device of the host vehicle, an indication to the effect that encounters are desired and information related to with what kind of other vehicle encounters are desired is received as preference information. Moreover, in cases in which the user of the host vehicle inputs both a category of other vehicle that the user wishes to avoid and a category of other vehicle that the user wishes to encounter, both items of information are received as preference information.

Moreover, the satellite image acquisition unit acquires a satellite image of travel path surroundings of the host vehicle. Then, based on the preference information, the detection unit detects other vehicles that correspond to a specific category among other vehicles appearing in the satellite image. Namely, if a user of the host vehicle wishes to avoid encounters with other vehicles belonging to a specific category, and has input this wish to the input device, among other vehicles appearing in the satellite image, other vehicles corresponding to the specific category that has been eschewed are detected. Moreover, in cases in which a user of the host vehicle wishes to encounter other vehicles belonging to a specific category and has input this wish to the input device, among other vehicles appearing in the satellite image, other vehicles corresponding to the specific category that has been welcomed are detected. As described above, according to the information processing device of the first aspect, since other vehicles belonging to a specific category are detected from the satellite image, compared to methods in which other vehicles are specified from vehicle information acquired from the respective vehicles, the vehicles can be classified according to detailed categories. Note that detection of another vehicle that belongs to a specific category may be performed using, for example, machine learning.

Moreover, using the information output unit, based on the preference information, route information relating to a route with a low probability of the host vehicle encountering another vehicle belonging to a specific category that the user wishes to avoid encountering and with a high probability of the host vehicle encountering another vehicle belonging to a specific category that the user wishes to encounter is output to a display area provided inside the vehicle cabin of the host vehicle. As a result, a preference route that matches the user's preferences is proposed to the user.

An information processing device of a second aspect is the first aspect further including: a route request receiving unit that receives, from the input device before commencement of travel to a destination, route request information related to on which of at least one standard route or a preferred route based on the preference information travel is desired; and a guidance unit that performs route guidance based on the route request information.

According to the information processing device of the second aspect, a route request receiving unit receives, before commencement of travel to a destination, route request information related to on which of at least one standard route or a preferred route based on the preference information travel is desired by the user. Further, if the user wishes to use a single standard route and inputs this wish to the input device, the host vehicle is provided with route guidance for this standard route by a guidance unit. On the other hand, in cases in which the user wishes to use the preferred route and inputs this wish to the input device, the host vehicle is provided with route guidance for a preferred route that matches a user's preference by the guidance unit. Note that the "standard route" used herein is a concept broadly encompassing routes for which guidance is provided by ordinary navigation systems, such as shortest-range routes, routes that allow a user to reach a destination quickly, and routes that do not pass through toll roads. This enables users to travel on standard routes when they are hurrying or wish to reduce tolls, and when driving comfortably, to travel on a preferred route that matches the preference.

An information processing system of a third aspect includes the information processing device of the first aspect or the second aspect; and a vehicle provided with the input device and the display region inside a vehicle cabin, in which the information processing device is configured to receive the preference information from the input device and output the route information to the display region.

According to the information processing system of the third aspect, the preference receiving unit of the information processing device receives, as preference information, information related to a specific category that is at least one of a category of other vehicle that a user of the host vehicle wishes to avoid encountering or a category of other vehicle that the user of the host vehicle wishes to encounter, from an input device provided inside a vehicle cabin of the host vehicle.

Moreover, the satellite image acquisition unit of the information processing device acquires a satellite image of travel path surroundings of the host vehicle. Then, based on the preference information, the detection unit of the information processing device detects other vehicles belonging to a specific category among other vehicles appearing in the satellite image.

Moreover, using the information output unit of the information processing device, based on the preference information, route information relating to a route with a low probability of the host vehicle encountering another vehicle belonging to a specific category that the user wishes to avoid encountering and with a high probability of the host vehicle encountering another vehicle belonging to a specific category that the user wishes to encounter is output to a display area provided inside the vehicle cabin of the host vehicle. This enables a preferred route to be proposed that matches the preferences of the user.

An information processing method of a fourth aspect is a method according to which a computer executes processing including: receiving, as preference information, information related to a specific category comprising at least one of a category of vehicle to avoid encountering or a category of vehicle for which an encounter is desired, from an input device provided inside a vehicle cabin of a host vehicle; acquiring a satellite image of travel path surroundings of the host vehicle; detecting another vehicle, which corresponds to the specific category, based on the preference information, from among other vehicles captured in the satellite image; and outputting, to a display region provided inside the vehicle cabin of the host vehicle, route information related to a route comprising at least one of a route having a low probability of encountering another vehicle, which corresponds to the category of vehicle to avoid encountering, or a route having a high probability of encountering another vehicle, which corresponds to the specific category for which there is a desire to encounter.

According to the information processing method of the fourth aspect, information related to a specific category that is at least one of a category of vehicle to avoid encountering or a category of vehicle for which an encounter is desired is received as preference information from an input device provided inside a vehicle cabin of a host vehicle. Moreover, a satellite image of travel path surroundings of the host vehicle is acquired. Then, based on the preference information, among other vehicles appearing in the satellite image, other vehicles belonging to the specific category are detected. Moreover, based on the preference information, route information relating to a route with a low probability of the host vehicle encountering another vehicle belonging to a specific category that the user wishes to avoid encountering and with a high probability of the host vehicle encountering another vehicle belonging to a specific category that the user wishes to encounter is output to a display area provided inside the vehicle cabin of the host vehicle. This enables a preferred route to be proposed that matches the preferences of the user.

A non-transitory recording medium of a fifth aspect stores an information processing program executable by a computer to perform processing, the processing including: receiving, as preference information, information related to a specific category that is at least one of a category of vehicle to avoid encountering or a category of vehicle for which an encounter is desired, from an input device provided inside a vehicle cabin of a host vehicle; acquiring a satellite image of travel path surroundings of the host vehicle; detecting another vehicle, which corresponds to the specific category, based on the preference information, from among other vehicles captured in the satellite image; and outputting, to a display region provided inside the vehicle cabin of the host vehicle, route information related to a route comprising at least one of a route having a low probability of encountering another vehicle, which corresponds to the category of vehicle to avoid encountering, or a route having a high probability of encountering another vehicle, which corresponds to the specific category for which there is a desire to encounter.

According to the non-transitory storage medium of the fifth aspect storing the information processing program, information related to a specific category that is at least one of a category of vehicle to avoid encountering or a category of vehicle for which an encounter is desired is received as preference information from an input device provided inside a vehicle cabin of a host vehicle. Moreover, a satellite image of travel path surroundings of the host vehicle is acquired. Then, based on the preference information, among other vehicles appearing in the satellite image, other vehicles belonging to the specific category are detected. Moreover, based on the preference information, route information relating to a route with a low probability of the host vehicle encountering another vehicle belonging to a specific category that the user wishes to avoid encountering and with a high probability of the host vehicle encountering another vehicle belonging to a specific category that the user wishes to encounter is output to a display area provided inside the vehicle cabin of the host vehicle. This enables a preferred route to be proposed that matches the preferences of the user.

The information processing device of the first aspect has the effect that a route that enables a specific other vehicle to be avoided and/or a route that enables a specific other vehicle to be encountered can be proposed in accordance with a user's preference.

The information processing device of the second aspect has an effect of enabling user comfort to be improved.

The information processing device of the third aspect has the effect that a route that enables a specific other vehicle to be avoided and/or a route that enables a specific other vehicle to be encountered can be proposed in accordance with a user's preference.

The information processing method of the fourth aspect has the effect that a route that enables a specific other vehicle to be avoided and/or a route that enables a specific other vehicle to be encountered can be proposed in accordance with a user's preference.

The non-transitory storage medium of the fifth aspect storing an information processing program has the effect that a route that enables a specific other vehicle to be avoided and/or a route that enables a specific other vehicle to be encountered can be proposed in accordance with a user's preference.

BRIEF DESCRIPTION OF THE DRAWINGS

An exemplary embodiment of the present disclosure will be described in detail based on the following figures, wherein.

DETAILED DESCRIPTION

Explanation follows regarding an information processing device according to an exemplary embodiment of the present disclosure, with reference to FIG. 1 to FIG. 6.

Figure 1:
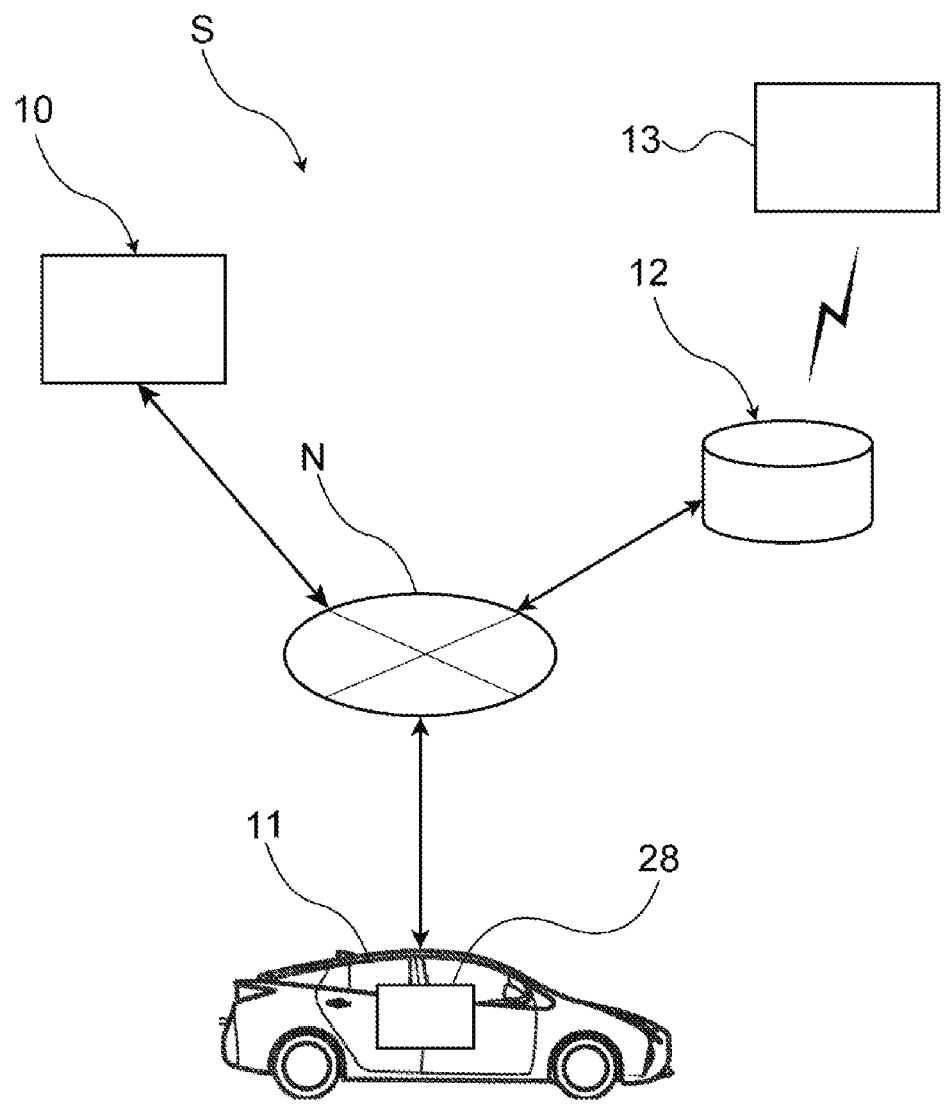
FIG. 1 is a schematic diagram schematically illustrating an information processing system according to the present embodiment.

As illustrated in FIG. 1, an information processing system S according to the present exemplary embodiment is configured including an information processing device 10, a vehicle 11, and a server 12. The information processing device 10, the vehicle 11, and the server 12 are connected through a network N so as to be capable of communicating with each other.

As an example, the information processing device 10 is installed outside the vehicle 11, and is configured so as to be capable of transmitting requested information in response to an instruction from the vehicle 11. Moreover, the information processing device 10 is configured to be able to acquire various information from the server 12 over the network N. Note that the information processing device may be provided inside the vehicle.

As an example, the server 12 is installed outside the vehicle 11, and is configured so as to be capable of receiving data from an artificial satellite 13. Accordingly, the server 12 holds satellite images captured by the artificial satellite 13. Note that the server may be provided inside the vehicle.

An information processing device 10 according to the present exemplary embodiment acquires a satellite image captured by the artificial satellite 13 via the server 12, and detects another vehicle that corresponds to a specific category from the satellite image, and further, outputs to the vehicle 11 path information relating to at least one of a route for which the likelihood of the vehicle 11 encountering the detected other vehicle is low or a route for which the likelihood of the vehicle 11 encountering the detected other vehicle is high. Hereinafter, the vehicle 11 is referred to as the "host vehicle 11".

Configuration of Host Vehicle 11

Figure 2:
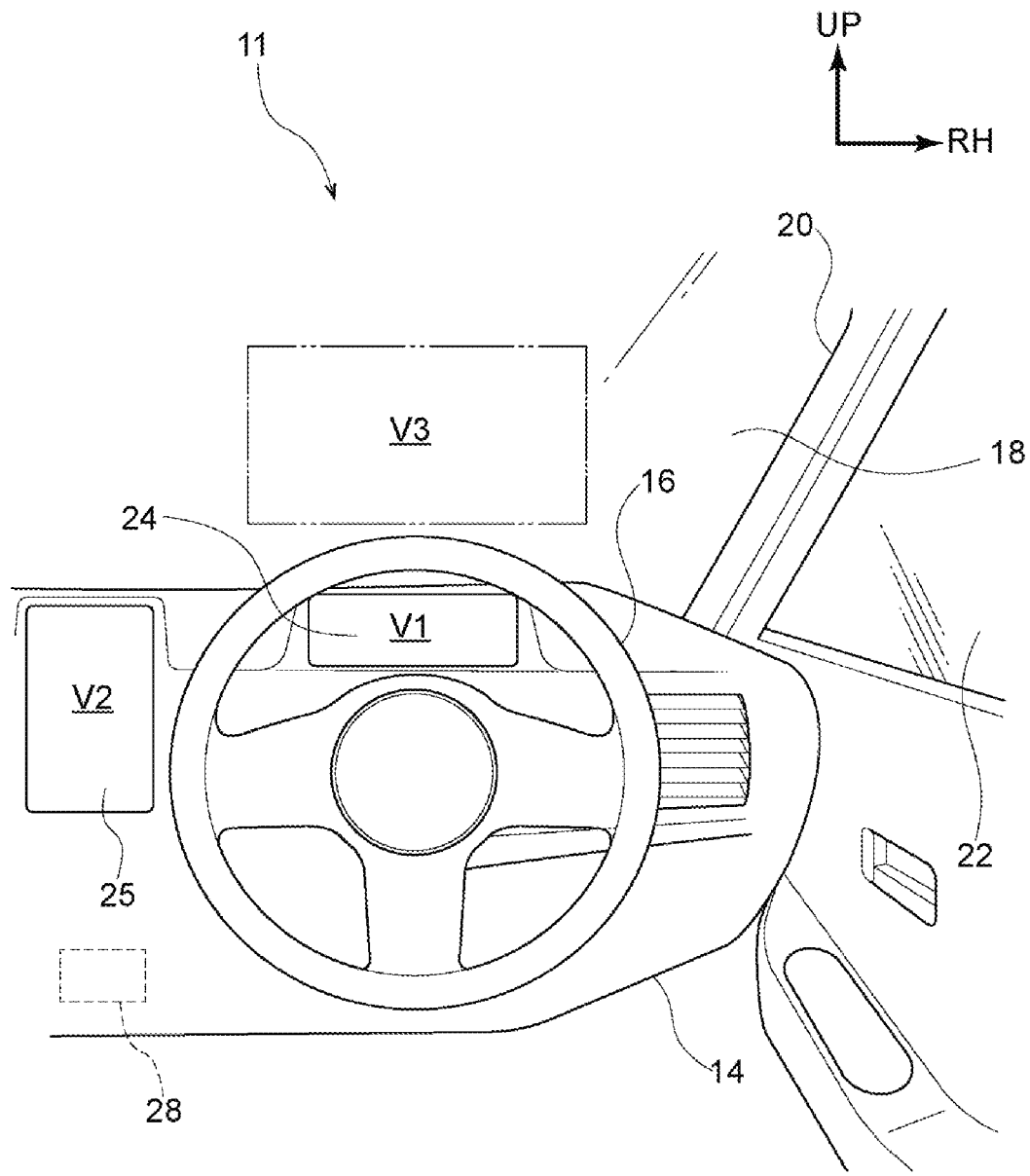
FIG. 2 is a schematic diagram illustrating a front section inside a vehicle cabin of the vehicle illustrated in FIG. 1, as viewed from a rearward side of the vehicle.

FIG. 2 is a schematic diagram illustrating a front section of the vehicle cabin of the host vehicle 11, as viewed from a vehicle rearward side. Note that the arrow UP illustrated in FIG. 2 indicates an upper side in a vehicle vertical direction, and the arrow RH indicates a right side in a vehicle width direction. In the following explanation, the vertical direction and the left-right direction respectively mean the vertical direction and the left-right direction in the vehicle vertical direction and the vehicle width direction.

As illustrated in FIG. 2, an instrument panel 14 extending in the vehicle width direction is provided at a front portion of the vehicle cabin of the host vehicle 11. A steering wheel 16 is provided rearward of the instrument panel 14. The steering wheel 16 of the present exemplary embodiment is provided, for example, on the right side of the vehicle. Namely, the host vehicle 11 is a right-hand-drive vehicle, and the driver's seat is set to the right side of the vehicle. Note that the vehicle is not limited to a right-hand-drive vehicle, and may be a left-hand-drive vehicle in which the driver's seat is set to the left side.

The instrument panel 14 is disposed at a vehicle lower side of a windshield glass 18. The windshield glass 18 is inclined downward toward the front side of the vehicle so as to partition the inside of the vehicle cabin from the outside of the vehicle cabin.

The right end portion of the windshield glass 18 is fixed to an inner side in the vehicle width direction of a front pillar 20 on the right side of the vehicle, which extends substantially in a vertical direction. A front side-windshield 22 is disposed at a vehicle rearward side of the front pillar 20. Although not illustrated in the drawings, the left end portion of the windshield glass 18 is fixed to a front pillar on the left side of the vehicle.

A meter display 24 serving as a first display device and including an image display region V1 is provided at the front of the vehicle relative to the driving seat and above the instrument panel 14. The meter display 24 is connected to various meter devices installed in the host vehicle 11. The meter display 24 is provided at a position at which it enters the field of view of an occupant (hereafter referred to as a "user") seated in the driving seat of the host vehicle 11 in a state in which the user's line of sight is directed ahead of the vehicle.

A center display 25 serving as a second display device and including an image display region V2 is provided at a central portion of the instrument panel 14 in the vehicle width direction. The center display 25 is a component of the navigation system 54 (see FIG. 4), and is configured to be capable of displaying various information, such as map information, position information of the host vehicle 11, traffic information, route information, and the like, as an image. The center display 25 also has the functions of an input device, and is configured so as to be operable by a user or the like. As an example, the center display 25 is capable of touch operation and voice operation by a user or the like. Note that the center display can be provided without an input function and can include only a display function.

Moreover, the host vehicle 11 includes an HUD 56 (see FIG. 4; hereafter referred to as "HUD 56") serving as a third display device capable of projecting images onto a display area V3. The HUD 56 is provided at an upper portion of the instrument panel 14 at the front of the vehicle relative to the driving seat. The display region V3 is configured as a projection plane on the windshield glass 18 ahead of the driver's seat.

An onboard unit 28 is provided in the host vehicle 11. The onboard unit 28 of the present exemplary embodiment is, for example, an electronic control unit (ECU) that performs various controls.

Hardware Configuration of Information Processing Device 10

Figure 3:
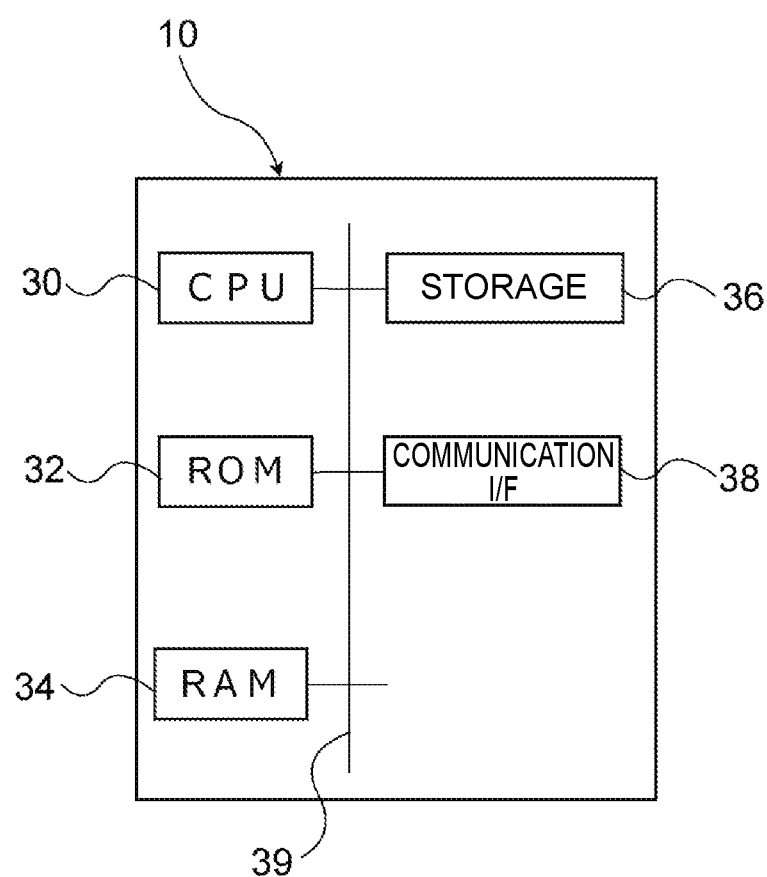
FIG. 3 is a block diagram illustrating a hardware configuration of the information processing device illustrated in FIG. 1.

As illustrated in FIG. 3, the information processing device 10 is configured including a central processing unit (CPU; serving as a processor) 30, read only memory (ROM) 32, random access memory (RAM) 34, storage 36, and a communication interface (communication I/F) 38. These configurations are connected together through an internal bus 39 so as to be capable of communicating with each other.

The CPU 30 is a central processing unit that executes various programs and controls various units. Namely, the CPU 30 reads a program from the ROM 32 or the storage 36, and executes the program using the RAM 34 as a workspace. The CPU 30 controls the respective configurations and performs various computation processing according to a program recorded in the ROM 32 or the storage 36.

The ROM 32 holds various programs and various data. The RAM 34 serves as a workspace to temporarily store programs and data. The storage 36 is configured by a hard disk drive (HDD) or a solid state drive (SSD), and is a non-transitory recording medium that holds various programs including an operating system and various data. In the present exemplary embodiment, a display program or the like for performing display processing is stored in the ROM 32 or the storage 36.

The communication I/F 38 is an interface used by the information processing device 10 to communicate with the server 12, the onboard unit 28, and other devices and, for example, employs a protocol such as CAN (Controller Area Network), Ethernet (registered trademark), LTE (Long Term Evolution), FDDI (Fiber Distributed Data Interface), Wi-Fi (registered trademark).

Hardware Configuration of Host Vehicle 11

Figure 4:
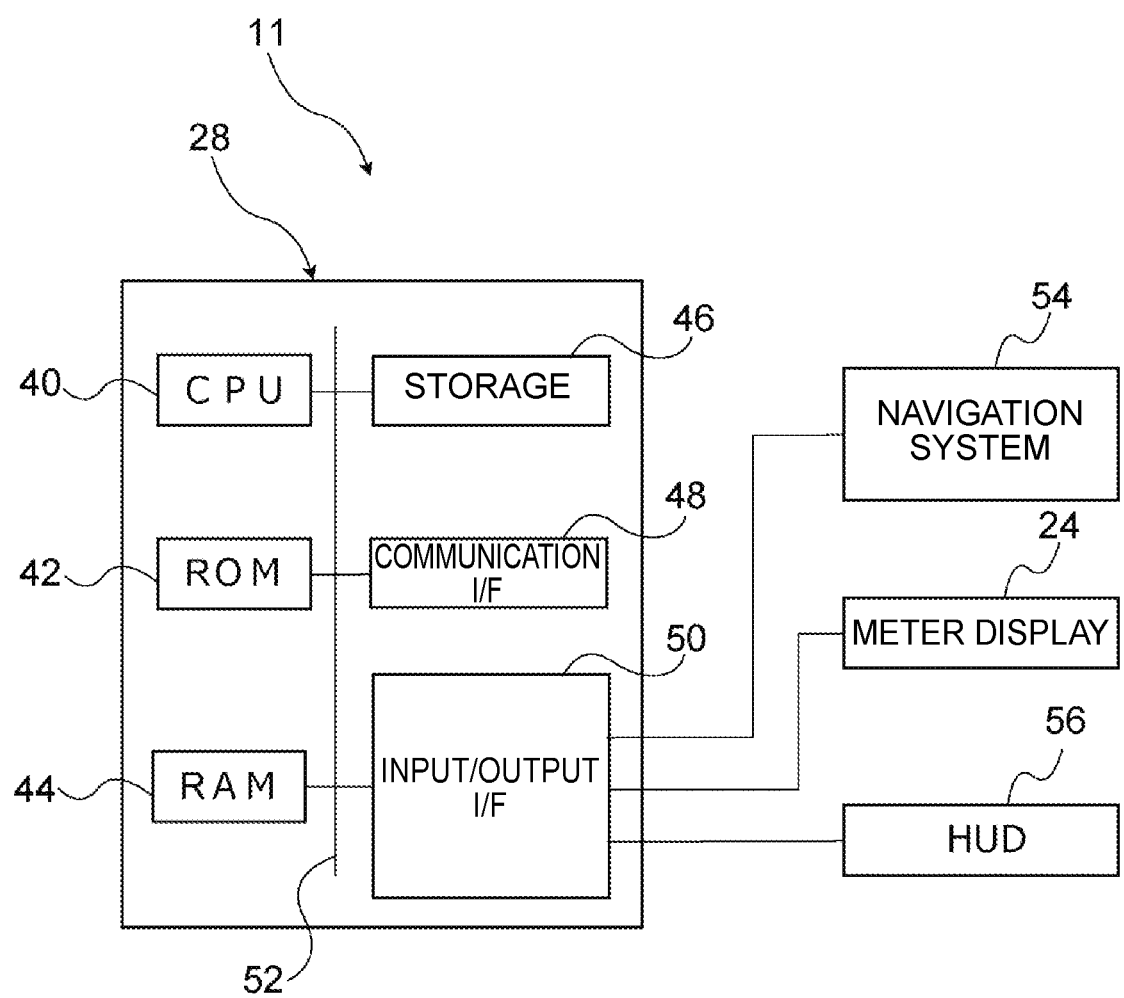
FIG. 4 is a block diagram illustrating a hardware configuration of the vehicle illustrated in FIG. 1.

As illustrated in FIG. 4, the onboard unit 28 is configured including a CPU 40, a ROM 42, a RAM 44, a storage 46, a communication interface (communication I/F) 48, and an input/output interface (input/output I/F) 50. These configurations are connected together through an internal bus 52 so as to be capable of communicating with each other.

The CPU 40 is a central processing unit that executes various programs and controls various units. Namely, the CPU 40 reads a program from the ROM 42 or the storage 46, and executes the program using the RAM 44 as a workspace. The CPU 40 controls the respective configurations and performs various computation processing according to a program recorded in the ROM 42 or the storage 46.

The ROM 42 holds various programs and various data. The RAM 44 serves as a workspace to temporarily store programs and data. The storage 46 is configured by an HDD or a SSD, and is a non-transitory recording medium that holds various programs including an operating system, as well as various data.

The communication I/F 48 is an interface used by the onboard unit 28 to communicate with the server 12 and other devices, and for example employs a protocol such as CAN (Controller Area Network), Ethernet (registered trademark), LTE (Long Term Evolution), FDDI (Fiber Distributed Data Interface), Wi-Fi (registered trademark), or the like.

A navigation system 54, the meter display 24, and the HUD 56 are connected to the input/output I/F 50.

The navigation system 54 holds map data in advance, and formulates a travel path to a destination set by a user or the like. Moreover, the navigation system 54 performs various types of guidance so as to enable the host vehicle 11 to travel along a set travel path. The navigation system 54 displays an image on the display region V2 of the center display 25.

Functional Configuration of Information Processing Device 10

Figure 5:
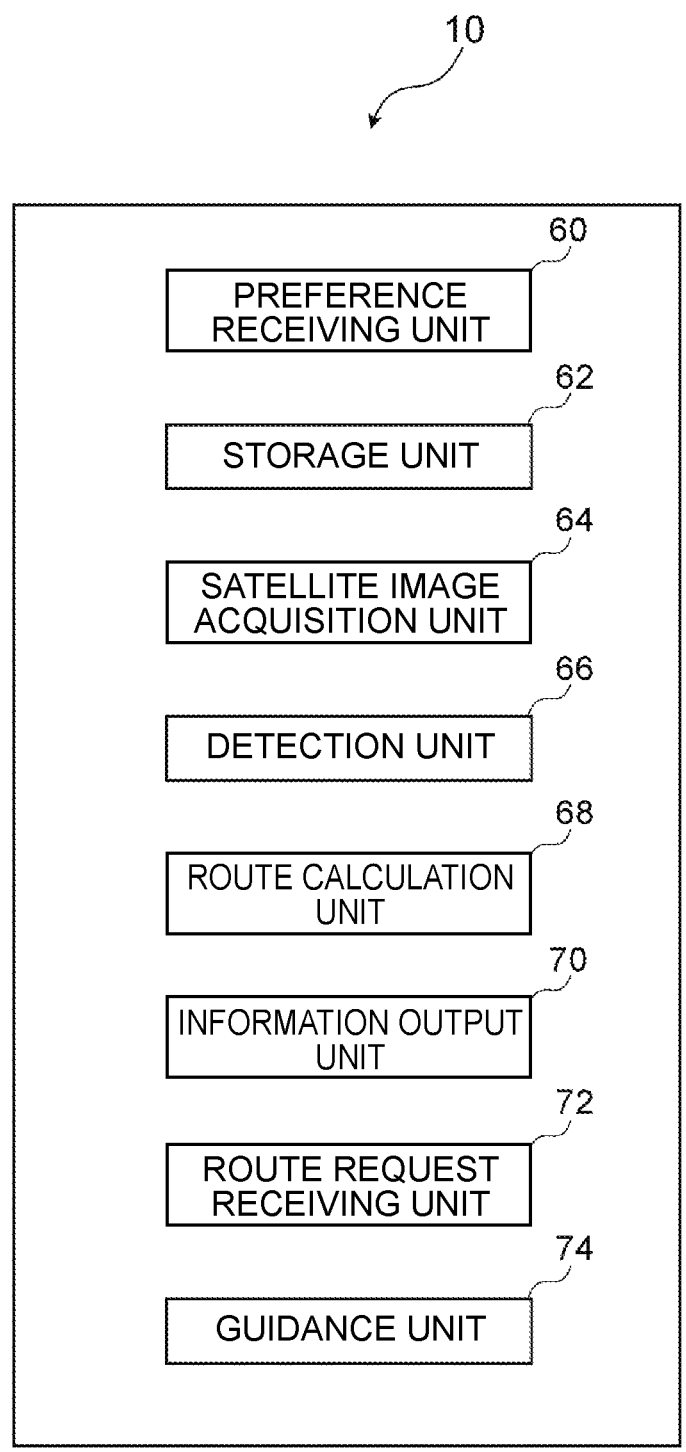
FIG. 5 is a block diagram illustrating a functional configuration of the information processing device illustrated in FIG. 3.

The information processing device 10 implements various functionality using the above hardware resources. As illustrated in FIG. 5, the information processing device 10 is configured including a preference receiving unit 60, a storage unit 62, a satellite image acquisition unit 64, a detection unit 66, a route calculation unit 68, an information output unit 70, a route request receiving unit 72, and a guidance unit 74 as functional configuration. Note that the respective functional configuration is implemented by the CPU 30 reading and executing a program stored in the ROM 32 or the storage 36.

The preference receiving unit 60 has a function of receiving information relating to a specific category that is at least one of a category of other vehicle with which encounters are avoided or a category of other vehicle with which encounters are desired, as preference information, from the center display 25 provided inside the vehicle cabin of the host vehicle 11. As an example, the preference receiving unit 60 receives preference information when a user operates the center display 25 and changes vehicle settings.

For example, the center display 25 displays, "select a category of other vehicle that you wish to avoid encountering", together with plural vehicle categories. Further, in a case in which the user selects a specific category on the center display 25, the preference receiving unit 60 receives, as preference information, an indication that avoidance is desired, and information related to what kind of other vehicle the user wishes to avoid encountering.

Further, the center display 25 displays, "select a category of other vehicle that you wish to encounter", together with plural vehicle categories, and if the user selects a specific category on the center display 25, the preference receiving unit 60 receives, as preference information, an indication that encounters are desired, and information related to what kind of other vehicle the user wishes to encounter. Note that although explanation has been given to the effect that the preference receiving unit 60 receives both an encounter avoidance wish and an encounter wish as preference information, there is no limitation thereto, and only one of these wishes may be received. One or plural specific categories may be selected by the user. Moreover, the above-described display on the center display 25 is an example, and there is no limitation thereto. Moreover, the input device is not limited to the center display 25. For example, the user's preference information may be received via a steering switch provided in the steering system. Alternatively, the preference information may be input by voice operation.

Note that the specific category is, for example, a category relating to a vehicle type, a vehicle model, a marking, a vehicle size, or the like. Note that the term "vehicle type" as used herein refers to a category of vehicle such as an ordinary passenger vehicle, a bus, a truck, a taxi, an emergency vehicle, a motorcycle, or a bicycle. Note that ordinary passenger cars may be further classified as sedans, SUVs, sports cars, and the like. Namely, "vehicle type" is classified according to use and body type. The term "marking" as used herein broadly includes displays towards other vehicles, such as provisional license training signs, novice driver signs, elderly driver signs, and stickers such as "BABY IN CAR".

For example, as an example of desiring avoidance, for reasons such as that the host vehicle must stop in a case in which an emergency vehicle such as an ambulance or a fire truck is traveling nearby, there are cases in which a user wishes to avoid encountering an emergency vehicle. In this case, the user selects an emergency vehicle as a category of a specific other vehicle with which the user wishes to avoid encounters, and the preference receiving unit 60 receives this preference information.

As an example of desiring an encounter, there are cases in which a user wishes to encounter a model of a sports car that the user admires, for example. In this case, the user selects the model of the sports car as a category of a specific other vehicle that the user wishes to encounter, and the preference receiving unit 60 receives the preference information.

The preference receiving unit 60 receives preference information relating to at least one specific category selected at the center display 25 in this manner.

The storage unit 62 has a function of causing the preference information accepted by the preference receiving unit 60 to be stored in the storage 36 or a non-illustrated external server.

The satellite image acquisition unit 64 has a function of acquiring a satellite image of the surroundings of the travel path of the host vehicle 11 captured by an artificial satellite. More specifically, the satellite image acquisition unit 64 accesses the server 12, and acquires a satellite image corresponding to a location from the current position to the destination of the host vehicle 11 from among satellite images stored in the server 12. The satellite image acquired by the satellite image acquisition unit 64 is, for example, at least one of a visible image, an infrared image, a water vapor image, a cloud-top emphasized image, a true color reproduction image, or an RGB composite image.

The detection unit 66 has a function of detecting another vehicle, which corresponds to a specific category from among other vehicles appearing in the satellite image, based on the preference information. In cases in which the preference information relates to an encounter avoidance wish, from among other vehicles appearing in the satellite image, other vehicles corresponding to the specific category that has been eschewed are detected. On the other hand, in cases in which the preference information relates to a desired encounter, from among other vehicles appearing in the satellite image, other vehicles corresponding to a welcomed specific category are detected. Further, in cases in which the preference information relates to both a desire to avoid encounters and a desire to encounter, from among other vehicles reflected in the satellite image, other vehicles corresponding to the specific category that has been eschewed and other vehicles corresponding to the welcomed specific category are respectively detected.

As an example, in a case in which a user selects a bus as a category of other vehicle that the user wishes to avoid encountering, the detection unit 66 detects all buses among other vehicles appearing in the satellite image. Note that detection of another vehicle that belongs to a specific category may be performed using, for example, machine learning.

The route calculation unit 68 has a function of, based on the preference information, calculating a preferred route that is at least one of a route on which there is a low probability of the host vehicle 11 encountering another vehicle that corresponds to the specific category for which encounter avoidance is desired, or a route on which there is a high probability of the host vehicle 11 encountering another vehicle that corresponds to the specific category for which an encounter is desired. For example, in a case in which the user selects a bus as a category of other vehicle that the user wishes to avoid, based on the number of buses detected by the detection unit 66, position information for each bus, and the like, a route with a low likelihood of the host vehicle 11 encountering a bus is calculated as a preferred route. Note that the route calculation unit may predict the travel route of the detected buses based on satellite images acquired at predetermined time intervals, such as every few seconds, and calculate the likelihood of encountering the detected buses based on the prediction information. Alternatively, plural preferred routes may be calculated. In this case, the route calculation unit may calculate a degree of preference together with the preferred route. The preferred route may be calculated using, for example, machine learning.

The information output unit 70 has a function of outputting the preferred route calculated by the route calculation unit 68 to a display region that is any one of the display region V1, the display region V2, or the display region V3 provided inside the vehicle cabin of the host vehicle 11, together with a standard route to a destination. As an example, the information output unit 70 outputs a preferred route, and a shortest route including tolls and a toll-free shortest route as standard routes, together with the time and fee required to reach a destination via each route, to the center display 25 including the display region V2. Note that the information output unit need not output the time or the fee to the destination to the display area. Further, the information output unit does not need to have a function of outputting a standard route. Moreover, the information output unit may output plural preferred routes calculated by the route calculation unit, for example, together with the degree of preference.

The route request receiving unit 72 has a function of receiving, from the center display 25, route request information relating to which route the user prefers, prior to starting travel to a destination. As an example, in a case in which the user selects a preferred route from the preferred route and the two standard routes displayed on the center display 25, the preference is accepted as route request information.

The guidance unit 74 has a function of providing guidance for a route based on the route request information. As an example, in a case in which the user selects a toll-free shortest route as a standard route on the center display 25, the host vehicle 11 is guided using this route. Moreover, in a case in which the user selects a preferred route on the center display 25, the host vehicle 11 is guided using the preferred route.

Action

Next, explanation follows regarding the action of the present exemplary embodiment.

According to the information processing system S and the information processing device 10 of the present exemplary embodiment, in cases in which a user of the host vehicle 11 wishes in advance to avoid encounters with another vehicle that falls under a specific category, and enters this wish on the center display 25, the preference receiving unit 60 receives, as preference information, an indication that avoidance is desired, and information related to what kind of other vehicle the user wishes to avoid encountering. On the other hand, in a case in which the user wishes to encounter another vehicle that falls under a specific category and enters this wish on the center display 25, the preference receiving unit 60 receives, as preference information, an indication that encounters are desired, and information related to what kind of other vehicle the user wishes to encounter. In cases in which the user inputs both a category of other vehicle that the user wishes to avoid and a category of other vehicle that the user wishes to encounter, the preference receiving unit 60 receives both items of information as preference information. This enables the user to input both avoidance of encounters with a specific vehicle and a desire to encounter a specific vehicle as preference information, and settings can be customized. The accepted preference information is stored in the storage unit 62.

Example of Processing Flow

Figure 6:
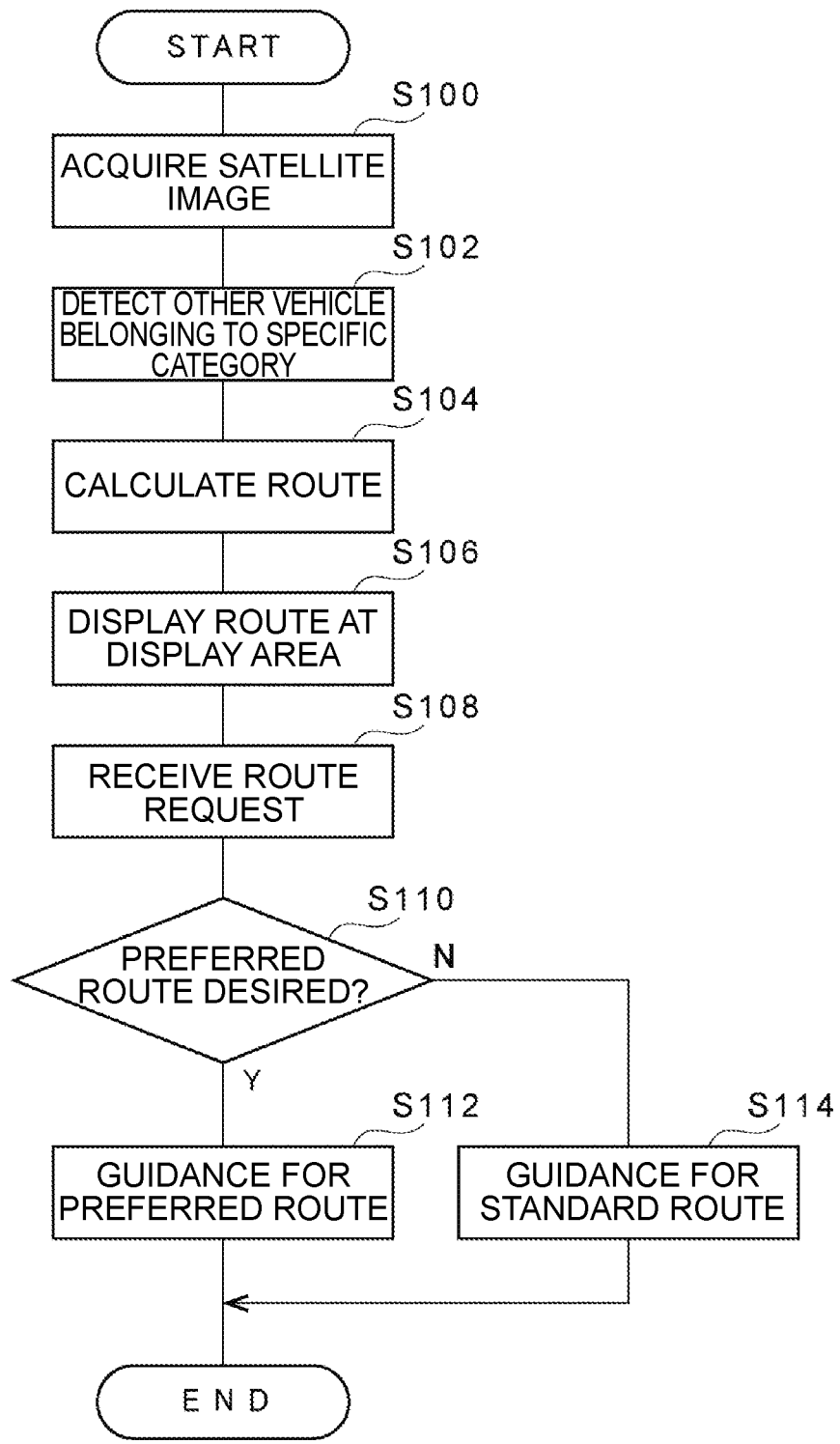
FIG. 6 is a flow chart illustrating an exemplary flow of display processing executed by the CPU in FIG. 3.

Explanation follows regarding an example of a flow of processing executed by the information processing device 10 at a timing when a destination is input by a user, with reference to FIG. 6.

At step S100 in FIG. 6, the CPU 30 of the information processing device 10 acquires a satellite image captured by an artificial satellite.

At step S102, the CPU 30 of the information processing device 10 detects another vehicle that corresponds to a specific category, based on stored preference information, among other vehicles appearing in the satellite image.

At step S104, based on the preference information, the CPU 30 of the information processing device 10 calculates a preference route with a low probability of encountering another vehicle that corresponds to a specific category with which encounter avoidance is desired, and with a high probability of encountering another vehicle that corresponds to a specific category with which an encounter is desired. At the same time, the CPU 30 of the information processing device 10 calculates a standard route.

At step S106, the CPU 30 of the information processing device 10 displays plural standard routes and a preferred route at one of the display region V1, the display region V2, or the display region V3.

At step S108, the CPU 30 of the information processing device 10 receives, from the center display 25, route request information relating to along which route travel is desired.

At step S110, the CPU 30 of the information processing device 10 determines whether or not travel on the preferred route is desired. In a case in which the CPU 30 of the information processing device 10 determines at step S110 that travel on the preferred route is desired—namely, in a case in which the user selects a preferred route on the center display 25—at step S112, the host vehicle 11 is guided along the preferred route, and the processing is ended.

On the other hand, in a case in which the CPU 30 of the information processing device 10 determines at step S110 that travel on the preferred route was not desired, the host vehicle 11 is guided along a standard route at step S114, and the processing is ended. Namely, in the present exemplary embodiment, in a case in which the user selects any standard route on the center display 25, the host vehicle 11 is guided along the selected standard route. Moreover, in cases in which the user does not operate the center display 25 within a predetermined period of time, the host vehicle 11 is guided using any of the standard routes.

Accordingly, according to the information processing system S and the information processing device 10 of the present exemplary embodiment, users can travel on standard routes when they are hurrying or wish to reduce tolls, and when wishing to drive comfortably according to preference, a preferred route can be traveled on.

According to the information processing system S and the information processing device 10 of the present exemplary embodiment, other vehicles corresponding to a specific category are detected from a satellite image captured by the artificial satellite 13. This enables vehicles to be identified according to a detailed classification, as compared to methods in which vehicle information acquired from respective vehicles is used to identify another vehicle that corresponds to a specific category.

In particular, according to the information processing system S and the information processing device 10 of the present exemplary embodiment, the specific category is a category relating to at least one of a vehicle type, a vehicle model, a marking, or a vehicle size. Accordingly, according to the preferences of the user, for a vehicle type such as a general vehicle, a bus, a truck, a taxi, an emergency vehicle, a motorcycle, or a bicycle, a route with a high likelihood of encountering these vehicle types or a route with a low likelihood of encountering these vehicle types is proposed.

Moreover, according to a user's preference, with respect to a particular model of vehicle, a route that has a high likelihood of encountering this vehicle model or a route that has a low likelihood of encountering these types of vehicle is proposed. Accordingly, for example, in a case in which a user wishes to encounter a sports car that the user admires, the information processing device 10 proposes a route with a high likelihood of encountering the sports car.

In addition, depending on the preferences of the user, for vehicles with provisional license training signs, novice driving signs, elderly driving signs, and stickers such as "BABY IN CAR", routes with a high or low likelihood of encountering these vehicles are proposed. For example, in a case in which a user wishes to avoid encountering a vehicle having a novice driving sign, the information processing device 10 proposes a route with a low likelihood of encountering such a vehicle.

Moreover, in accordance with user preferences, for a vehicle of a specific size, such as a vehicle with a length in a forward-rearward direction of not less than a predetermined length, a vehicle with a length in a forward-rearward direction of not more than a predetermined length, a vehicle with a predetermined width or more, or a vehicle with a predetermined width or less, routes with a high likelihood or a low likelihood of encountering these vehicles are proposed. For example, if a user wishes to avoid encountering a large vehicle, the information processing device 10 proposes a route with a low likelihood of encountering a large vehicle.

Moreover, according to the information processing system S and the information processing device 10 of the present exemplary embodiment, the preference receiving unit 60 accepts both the encounter avoidance wish and the encounter wish as preference information, and can accept plural selections, respectively. This enables the route proposal to be highly customized and to reflect the preferences of the user in detail.

Moreover, according to the information processing system S and the information processing device 10 of the present exemplary embodiment, the received preference information is stored in the storage unit 62, and the detection unit 66 detects another vehicle that corresponds to a specific category based on the stored preference information. This enables the inconvenience of the user entering preference information at each time of driving to be avoided.

Moreover, according to the information processing system S and the information processing device 10 of the present exemplary embodiment, the information output unit 70 outputs the preferred route, and both the shortest route with tolls and the shortest toll-free route as standard routes, together with the time and fee required to reach the destination for reach route, to the center display 25 including the display region V2. This enables the user to visually understand plural standard routes and the preferred route, and whether or not to select a preferred route can be determined in consideration of the balance between time and fee.

Supplementary Explanation of the Above Exemplary Embodiment

Although the above exemplary embodiment has been described on the basis that preference information input by a user in advance as a vehicle setting is stored in the storage unit 62, and that the processing of FIG. 6 is executed based on the stored preference information at a timing when a destination is input by the user, there is no limitation thereto. For example, the information processing device may accept preference information each time a user sets a destination.

Although the route request receiving unit 72 has been described in the above exemplary embodiment as receiving route request information relating to which route is desired before starting travel to a destination, there is no limitation thereto. For example, the information processing device may be configured not to accept route request information from a user, and may automatically guide the host vehicle 11 on a preferred route each time.

Moreover, the flow of processing described in the above exemplary embodiments is an example, and unnecessary steps may be deleted, new steps may be added, or the processing order may be rearranged within a range not departing from the spirit of the present disclosure.

What is claimed is:

1. An information processing device, comprising:
a processor that is configured to:
receive, as a user's preference information, information related to a specific category comprising at least one of a category of vehicle the user prefers to avoid encountering or a category of vehicle for which the user desires an encounter;
acquire a satellite image of travel path surroundings of a host vehicle;
detect another vehicle, which corresponds to the specific category, based on the user's preference information, from among other vehicles captured in the satellite image; calculate, based on the user's preference information, route information related to a route comprising at least one of a route having a low probability of encountering another vehicle, which corresponds to the category of vehicle to avoid encountering, or a route having a high probability of encountering another vehicle, which corresponds to the category of vehicle for which the encounter is desired; and
output, to a display region provided inside a vehicle cabin of the host vehicle, the calculated route information based on the user's preference information.

2. The information processing device of claim 1, wherein the processor is configured to:
before commencement of travel to a destination, receive, from an input device, route request information indicating whether travel is desired on at least one standard route or a preferred route based on the user's preference information; and
perform route guidance based on the route request information.

3. An information processing system, comprising:
the information processing device of claim 1; and
the host vehicle provided with an input device and the display region inside the vehicle cabin, wherein the information processing device is configured to receive the user's preference information from the input device and output the route information to the display region.

4. The information processing device of claim 1, wherein the specific category is a category related to at least one of a vehicle type, a vehicle model, a marking, or a vehicle size.

5. An information processing method, comprising, by a processor:
receiving, as a user's preference information, information related to a specific category comprising at least one of a category of vehicle the user prefers to avoid encountering or a category of vehicle for which the user desires an encounter, from an input device provided inside a vehicle cabin of a host vehicle;
acquiring a satellite image of travel path surroundings of the host vehicle;
detecting another vehicle, which corresponds to the specific category, based on the user's preference information, from among other vehicles captured in the satellite image; calculating, based on the user's preference information, route information related to a route comprising at least one of a route having a low probability of encountering another vehicle, which corresponds to the category of vehicle to avoid encountering, or a route having a high probability of encountering another vehicle, which corresponds to the category of vehicle for which the encounter is desired; and
outputting, to a display region provided in the vehicle cabin of the host vehicle, the calculated route information based on the user's preference information.

6. A non-transitory recording medium storing a program executable by a computer to perform processing, the processing comprising:
receiving, as a user's preference information, information related to a specific category comprising at least one of a category of vehicle the user prefers to avoid encountering or a category of vehicle for which the user desires an encounter, from an input device provided inside a vehicle cabin of a host vehicle;

acquiring a satellite image of travel path surroundings of the host vehicle;

detecting another vehicle, which corresponds to the specific category, based on the user's preference information, from among other vehicles captured in the satellite image; calculating based on the user's preference information, route information related to a route comprising at least one of a route having a low probability of encountering another vehicle, which corresponds to the category of vehicle to avoid encountering, or a route having a high probability of encountering another vehicle, which corresponds to the category of vehicle for which the encounter is desired; and outputting, to a display region provided inside the vehicle cabin of the host vehicle, the calculated route information based on the user's preference information.

\* \* \* \* \*